G. C. SNYDER.
SNAP FASTENER.
APPLICATION FILED APR. 21, 1915.
1,166,417. Patented Dec. 28, 1915.
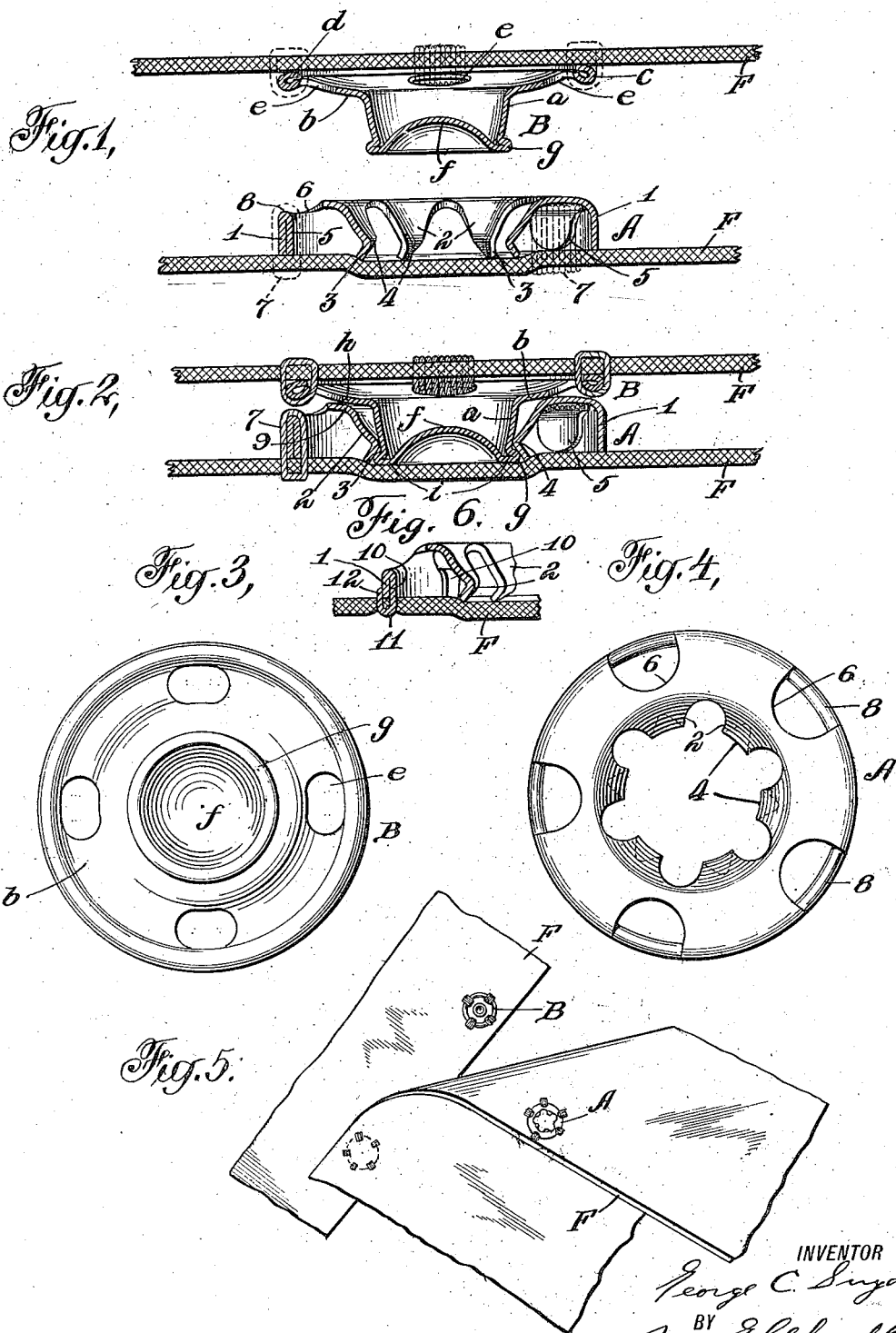
INVENTOR
George C. Snyder
BY
ATTORNEYS

UNITED STATES PATENT OFFICE.

GEORGE C. SNYDER, OF NEW YORK, N. Y.

SNAP-FASTENER.

1,166,417.  Specification of Letters Patent. Patented Dec. 28, 1915.

Application filed April 21, 1915. Serial No. 22,741.

*To all whom it may concern:*

Be it known that I, GEORGE C. SNYDER, a citizen of the United States, residing at New York, county of New York, and State of New York, have invented certain new and useful Improvements in Snap-Fasteners; and I do hereby declare the following to be a full, clear, and exact description of the invention, such as will enable others skilled in the art to which it appertains to make and use the same.

This invention relates to snap fasteners, and has for its object to provide a fastener of this type which is especially adapted for use on articles which have to be laundried, such as shirts, undergarments and the like. As will hereinafter be clear, however, the improved fastener is not limited to use on such articles, but may be used on all articles where snap fasteners are required.

With this object in view, the invention consists in providing a socket member formed from a single piece of sheet-metal, to simplify the construction and to reduce the cost of manufacture, and having a plurality of spring fingers to engage a stud member, to be hereinafter described. The socket member is so shaped that the spring fingers possess a maximum degree of resiliency and are protected from harm during laundrying by another portion of the socket member which is designed to take and withstand the compression forces incident to laundrying, and thereby relieve the spring fingers of such destructive forces. Not only does such portion of the socket member protect the spring fingers themselves against these destructive forces, but also serves, due to its peculiar construction hereinafter described, to render the whole socket member rigid and damage-proof, so that no harm will be done to the same during laundrying. Furthermore, the stud member is so constructed with respect to the socket member that when the two are pressed together, two abutting parts on the stud and socket members will act as stops after the two members have been engaged to positively limit further movement of the members toward each other, thereby relieving the spring fingers above mentioned of any undue strains caused by the members of the fastener being forced into closer proximity than is actually necessary to engage the members. With this feature in mind, the head of the stud member is so constructed that when the members of the fastener are in their closest relation, the highest points of the stud member will be so located in the socket member that such high points will not be appreciably felt by the finger of the person pressing the members together. In other words, in the closest relation of the stud and socket members, the top of the stud member lies in substantially the same plane with the surface of the fabric to which the socket member is attached.

The invention is illustrated in the accompanying drawing, in which:—

Figure 1 is a vertical section showing the stud and socket members of the improved snap fastener, each being applied to a portion of fabric and being shown in position ready to be "snapped" or engaged; Fig. 2 is a similar view showing the stud member inserted in the socket member; Fig. 3 is a top plan view of the stud member; Fig. 4 is a top plan view of the socket member; Fig. 5 is a perspective view showing the stud and socket members of the fastener sewed near the edges of two portions of fabric to be united by the fasteners; and Fig. 6 is a vertical section of a portion of a modified form of socket member in which it is applied to the fabric mechanically instead of by sewing.

Referring to the drawing, it will be seen that the socket member, denoted generally by the reference character A, comprises a single piece of sheet-metal bent to such form that the cross section of the annular socket member is substantially arch-shaped. This is for the purpose of providing an outer circular wall 1, which, as will be noted, is substantially at right angles to the plane of the fabric indicated at F. This substantially straight wall, which will hereinafter be termed "the vertical wall," for convenience, spaces the socket member its proper distance from the fabric F and is designed to receive compression forces incident to laundrying.

The inner part of the sheet-metal socket member is formed into a plurality of integral spring fingers 2, which, as will be noted from Fig. 1, are inclined downwardly toward the axis of the socket member to form a tapering opening into which the stud member may be inserted. The extremital portions of the spring fingers 2 are bent backwardly, as indicated at 3, to form a circular series of rounded shoulders 4, which are designed to engage with the proper part of the stud member, as will hereinafter appear.

The socket member shown in Figs. 1, 2 and 4 is adapted to be sewed to the fabric, and to accommodate the threads, a plurality of tongues 5 are stamped from the metal of the socket and are turned inwardly to lie closely against the vertical wall 1. The bending back of the tongues 5 in this manner forms a plurality of thread-receiving openings 6 through which the threads 7 may pass when the socket member is sewed in place. It will be noted that by forming the thread openings in this manner, a rounded edge is presented to the threads, as shown at 8, which has no tendency to cut or injure the threads. Furthermore, these rounded edges 8, formed by bending the tongues 5 inwardly, lie in a plane which is below the plane of the upper surface of the socket member and, therefore, the threads passing over these rounded edges 8 will be counter-sunk and thus additionally protected from injury.

The stud member, which is preferably used in combination with the socket member above described, is indicated at B, and comprises a tubular shank portion $a$, having a basal flange $b$, which, in turn, is provided with a peripheral bead $c$, the extreme peripheral edge $d$ of the flange being bent backwardly upon itself during the formation of the bead, as will be clear from an inspection of Fig. 1. The flange $b$ is provided adjacent the bead $c$ with a plurality of spaced thread-receiving openings $e$. The threads serving to attach the stud member to the fabric are passed through the openings $e$ and around the bead $c$, as clearly shown in Fig. 1.

The head portion of the stud member is concave, as shown at F, and the edge portion of the stud member is upset sufficiently to form a circular bead or projection $g$.

When the stud member is inserted in the socket member, the former will pass into the latter until a portion $h$ of the flange $b$ of the stud member contacts with the highest portion or crown 9 of the arch of the socket member. This movement of the stud and socket members, however, is sufficient to cause the circular series of shoulders 4 on the spring fingers to engage behind the bead or flange $g$ of the stud member, as clearly shown in Fig. 2. The two members will, therefore, be yieldingly held together. It will be noted, however, that as the portions 9 and $h$ are in contact, the stud and socket members cannot be moved into closer relation than that shown in Fig. 2. These parts 9 and $h$, therefore, take all compression forces after the members are engaged, thereby relieving the spring fingers of this burden. In order to accomplish this, however, the length of the stud shank must be so chosen with respect to the length of the spring fingers that the parts 9 and $h$ will be just in contacting relation when the portions 4 of the spring fingers engage behind the bead $g$ of the stud member. The length of the said shank is also so chosen that when the parts 9 and $h$ are in contacting relation, the highest points indicated at $i$ of the stud member will lie almost in the same plane as the surface of the fabric F, to which the socket member is attached. Even if the highest portions $i$ of the stud member do project slightly beyond the plane of the surface of the fabric F, the stud member will not be perceptibly felt by the thumb or finger of the person pressing the members together, due to the concave shape of the head of the stud, and the resulting relatively small area which would be effective in making the presence of the stud member felt as it is forced into the socket member. If the head of the stud member were bulged outwardly and were not constructed substantially as shown in the drawing, the stud member would be forced against the finger or thumb as the members are engaged, and this has been found to be an objectionable feature of many of the prior snap fasteners.

In the modified form of the socket member shown in Fig. 6, means is provided for attaching the same to the fabric mechanically instead of by sewing the same in place. For this purpose, a plurality of tines 10 are stamped from the metal of the socket and bent inwardly and downwardly. The extremital portions of the tines are sharpened to be capable of penetrating the fabric F. When a socket member of this character is applied to the fabric, the extremities of the tines are forced through the fabric and are then bent outwardly, as indicated at 11, and then upwardly through the fabric again, as indicated at 12. In this manner, the socket member may be mechanically attached to the fabric, notwithstanding the fact that the entire socket member is made of one piece of sheet-metal.

Due to the cross sectional arch-shape of the socket member, it is obvious that the same will stand great stresses, and that the spring fingers 2 do not have to take any of such stresses. Furthermore, the spring fingers 2 are completely surrounded by and inclosed in the vertical wall 1 of the socket member, and thereby protected from injury. The specific shape of the socket member also permits the spring fingers to possess the maximum degree of resiliency, as the metal of the socket is always bent in the same direction in the making thereof, and not a single bend in the metal of the socket member detrimentally affects the resiliency of the spring fingers, as is the case with most of the snap fasteners now in use. It will also be noted that the spring fingers do not engage at their extremities with the stud member, but that the slightly rounded shoulders 4, caused by the bending of the extremital portions 3 of the fingers, engage the stud member. As the radial projection or bead *g* on the stud has a slightly rounded, and hence smooth, outer surface, and as the bends or shoulders 4 of the spring fingers coöperate with this bead, no sharp edges on either the stud or socket member are presented to the coöperating parts of the other member. If raw, sharp edges of the spring fingers were allowed to act upon the stud member, they would at first cut and scar the metal of the stud member until they became worn and rounded to a certain extent, but then they would fail to properly grip the head of the stud.

When the socket members are sewed to the fabric, they are easily held in place during the sewing operation and do not tend to slip and slide over the surface of the fabric. The sewing of the socket member in place is, therefore, made comparatively easy, which is greatly in favor of its domestic use.

Obviously numerous modifications and changes may be made in the details of construction as above described, without departing from the spirit or scope of the invention as defined in the accompanying claims.

What I claim is:—

1. A snap fastener comprising an annular socket member which is arch-shaped in cross section and provided with a plurality of spring fingers inclined from the crown of the arch toward the base of the socket member, and a stud member having a radially projecting portion spaced from the base of the stud member and behind which the extremital portions of said spring fingers are adapted to engage, said stud member having a portion with which the crown of the arch of the socket member is adapted to contact when the spring fingers so engage behind said radially projecting portion of the stud to transmit all compression forces to the crown of the arch of the socket member.

2. A snap fastener comprising an annular socket member which is arch-shaped in cross section and provided with a plurality of spring fingers inclined from the crown of the arch toward the base of the socket member, and a stud member having a radially projecting portion spaced from the base of the stud member and behind which the extremital portions of said spring fingers are adapted to engage, said stud member having a portion with which the crown of the arch of the socket member is adapted to contact when the spring fingers so engage behind said radially projecting portion of the stud to transmit all compression forces to the crown of the arch of the socket member, the distance between said portion of the stud member and its radially projecting portion being so chosen with respect to the distance between the crown of the arch of the socket member and the extremities of the spring fingers that the spring fingers are relieved of such compression forces when the crown of the arch is in contact with said portion of the stud member.

3. A snap fastener comprising a socket member having a plurality of spring fingers inclined toward the base of the socket member to form a tapering stud-receiving opening, and a stud member having a head portion designed to be engaged by the extremital portions of said spring fingers, the head of the stud being concaved toward the base of the stud member, for the purpose described.

4. A socket member for snap fasteners comprising an annular ring-like member which is substantially arch-shaped in cross section, the outer wall being substantially at right angles to the base of the socket member, and a plurality of spring fingers inclined from the crown of the socket member toward the base thereof.

5. A socket member for snap fasteners comprising an annular ring-like member which is substantially arch-shaped in cross section, the outer wall being substantially at right angles to the base of the socket member, and a plurality of spring fingers inclined from the crown of the socket member toward the base thereof, said outer wall being of sufficient height to relieve said spring fingers of substantially all compression forces.

6. A socket member for snap fasteners comprising an annular ring-like member which is substantially arch-shaped in cross section and formed from a single piece of sheet-metal, the outer wall being substantially at right angles to the base of the socket member and the inner wall being formed into a plurality of inclined spring fingers.

7. A socket member for snap fasteners comprising an annular ring-like member which is substantially arch-shaped in cross section and formed from a single piece of sheet-metal, the outer wall being substantially at right angles to the base of the socket member and the inner wall being formed into a plurality of inclined spring fingers, the extremital portions of said spring fingers being bent to form a circular series of shoulders for engagement with a stud member.

8. A socket member for snap fasteners comprising an annular ring-like member which is substantially arch-shaped in cross section, the outer wall serving to space the top of the socket member from the fabric to which the member is secured and to form an annular protecting casing, and a plurality of spring fingers inclined from the top of the socket member toward the base thereof, said spring fingers being inclosed and protected by said outer wall of the socket member.

9. A fastening device made of sheet-metal and having a plurality of thread-receiving openings formed by a series of tongues stamped from the metal of the fastening device and turned back against the same to form the aforesaid openings and to provide rounded edges over which the securing threads may pass.

10. A fastening device made of sheet metal and having a circular wall disposed substantially at right angles to the base of the fastening device, a plurality of tongues stamped from the metal of the fastening device and bent inwardly and downwardly against said circular wall to form a series of thread-receiving openings, one edge of each of which is rounded to prevent cutting of the threads passing over the same.

11. A metallic socket member for snap fasteners comprising an annular ring-like member which is substantially arch-shaped in cross section, the outer wall being substantially at right angles to the base of the socket member and the inner wall being formed into a plurality of spring fingers inclined from the top of the socket member toward the base thereof, and a plurality of tongues stamped from the metal of the socket member and bent inwardly and downwardly against said outer wall to form a series of thread-receiving openings to permit said outer wall to be sewed to the fabric, the edge of each of the thread-receiving openings over which the threads pass being rounded as the result of the turning back of said tongues to prevent cutting of the threads.

12. A socket member for snap fasteners comprising an annular ring-like member which is substantially arch-shaped in cross section, said member having a plurality of thread-receiving openings formed therein so that the edge of each opening over which the threads pass lies in a plane which is below the plane of the top of the socket member, substantially as and for the purpose described.

In testimony whereof I affix my signature.

GEORGE C. SNYDER.